(12) United States Patent
Planche et al.

(10) Patent No.: US 10,300,925 B2
(45) Date of Patent: May 28, 2019

(54) METHOD FOR SELECTING THE TARGET STATE OF A DRIVE TRAIN

(71) Applicants: RENAULT s.a.s, Boulogne-Billancourt (FR); NISSAN MOTOR Co. Ltd, Yokohama-Shi (JP)

(72) Inventors: Gregory Planche, Orsay (FR); Frederic Roudeau, Vitry-sur-Seine (FR)

(73) Assignees: RENAULT s.a.s., Boulogne-Billancourt (FR); NISSAN MOTOR Co., Ltd., Yokohama-Shi (JP)

( * ) Notice: Subject to any disclaimer, the term of this patent is extended or adjusted under 35 U.S.C. 154(b) by 178 days.

(21) Appl. No.: 15/324,463

(22) PCT Filed: May 4, 2015

(86) PCT No.: PCT/FR2015/051178
§ 371 (c)(1),
(2) Date: Jan. 6, 2017

(87) PCT Pub. No.: WO2016/005668
PCT Pub. Date: Jan. 14, 2016

(65) Prior Publication Data
US 2017/0197633 A1    Jul. 13, 2017

(30) Foreign Application Priority Data

Jul. 10, 2014   (FR) ..................................... 14 56667

(51) Int. Cl.
*B60W 50/08*    (2012.01)
*B60W 20/00*    (2016.01)
(Continued)

(52) U.S. Cl.
CPC .......... *B60W 50/082* (2013.01); *B60K 6/547* (2013.01); *B60W 20/00* (2013.01); *B60W 20/10* (2013.01);
(Continued)

(58) Field of Classification Search
CPC combination set(s) only.
See application file for complete search history.

(56) References Cited

U.S. PATENT DOCUMENTS

2005/0222745 A1* 10/2005 Krenn .................. B60W 10/04
701/90
2010/0009805 A1*  1/2010 Bachmann ............ B60K 6/365
477/5

(Continued)

FOREIGN PATENT DOCUMENTS

AT          009 756 U1    3/2008
DE      199 32 492 A1    2/2001
(Continued)

OTHER PUBLICATIONS

International Search Report dated Sep. 22, 2015 in PCT/FR2015/051178 filed May 4, 2015.
(Continued)

*Primary Examiner* — Redhwan K Mawari
(74) *Attorney, Agent, or Firm* — Oblon, McClelland, Maier & Neustadt, L.L.P.

(57) ABSTRACT

A method selects a target state of a vehicle driveline connecting at least a combustion engine and/or an electric machine to the wheels of the vehicle by a transmission, from a set of states present on the transmission, which are defined by various combinations of couplers and reduction gears thereof in order to transfer torque from the combustion engine and/or from the electric machine to the wheels over one or more gear ratios. The method includes filtering to
(Continued)

determine, from a list of available states, state consecutive eligible sets as a function of combined driveability constraints.

10 Claims, 3 Drawing Sheets

(51) Int. Cl.
- *B60K 6/547* (2007.10)
- *B60W 20/10* (2016.01)
- *F16H 61/02* (2006.01)
- *F16H 61/00* (2006.01)

(52) U.S. Cl.
CPC . *B60W 2510/1005* (2013.01); *B60W 2520/10* (2013.01); *B60W 2530/16* (2013.01); *B60Y 2200/92* (2013.01); *B60Y 2300/182* (2013.01); *F16H 61/0213* (2013.01); *F16H 2061/0075* (2013.01); *Y02T 10/7258* (2013.01); *Y10S 903/919* (2013.01); *Y10S 903/93* (2013.01)

(56) References Cited

U.S. PATENT DOCUMENTS

| | | | |
|---|---|---|---|
| 2011/0130901 A1* | 6/2011 | Mori | B60K 6/445 701/22 |
| 2015/0167794 A1* | 6/2015 | Morio | F16H 3/78 475/5 |
| 2015/0184600 A1* | 7/2015 | Gehringer | F02D 35/02 123/350 |
| 2015/0204442 A1* | 7/2015 | Kishi | F16H 61/66259 701/58 |
| 2017/0197633 A1* | 7/2017 | Planche | B60W 50/082 |

FOREIGN PATENT DOCUMENTS

| | | |
|---|---|---|
| FR | 2 911 567 A1 | 7/2008 |
| WO | 2004/0030974 A1 | 4/2004 |
| WO | 2012/000806 A1 | 1/2012 |

OTHER PUBLICATIONS

French Search Report dated Mar. 23, 2015 in FR 1456667 filed Jul. 10, 2014.

* cited by examiner

METHOD FOR SELECTING THE TARGET STATE OF A DRIVE TRAIN

BACKGROUND

The present invention relates to the control strategies implemented in the computing units of the power trains.

It has a preferred, but not limiting, use on power trains comprising at least a combustion engine and a traction electric machine.

More precisely, the object of this invention a method for selecting the target state of a vehicle driveline connecting at least a combustion engine and/or an electric machine to the wheels of the vehicle by means of a transmission, from a set of states present on the transmission. These states are defined by various combinations of couplers and reduction gears, in order to transfer the torque from the combustion engine and/or from the electric machine to the wheels, over one or more gear ratios.

The state of the driveline can be defined by a combination of couplers and reduction gears that are called upon. The aim of the target state of the driveline is to optimize the operating point of the power train. On a combustion power train, a driveline state can be simply defined by the engagement of a ratio and the position (open or closed) of an input clutch between the engine and the gearbox. On a hybrid power train, the definition thereof is inevitably more complex, since it must integrate the state of an electric machine which can drive the vehicle via the same, or via a different axle, as the combustion engine.

The development of the target state of the driveline seeks a compromise between acoustic, driveability, consumption and pollution control performances. The publication U.S. Pat. No. 8,066,417 describes a method for selecting the transmission optimum ratio on a combustion power train, as a function of some constraints influencing the target ratio, such as the speed of the engine thereof, the minimum and maximum speeds of the engine, the maximum available power on each of the ratios, the power requirement of the driver, and the associated consumption of fuel.

This method does not provide for the management of several energy modes. For this reason, it cannot be transposed onto a hybrid power train, since, for a same desired power, there generally exist several possible distributions of power, between the combustion engine, and the electric motor(s). Moreover, the power of the electric machine can optionally pass through the transmission. The electric (ZEV meaning Zero Emission Vehicle) mode is a new power train state to be considered, just like the combustion and hybrid ratios.

On a hybrid vehicle, other considerations can come into play, in the management of the operating modes and of the transmission ratios. As indicated above, the acoustic behavior of the vehicle depends, among other things, on the distribution between the electric power and the combustion power. The driveability, linked to the performance of the power train, also depends on the charge state of the battery, since only the combustion engine can be used when they are discharged. Finally, the energy management laws, which determine, for each operating point, the distribution of power while complying with the consumption and pollution control constraints, and the target ratio of the transmission, must also take into account the charge state of the battery.

The states of a hybrid vehicle driveline can be defined by a combination of coupler(s) and reduction gear(s) specific to a given vehicle architecture. There are more of these combinations than on a conventional transmission, since they integrate the additional coupling of one or more electric motors driving the vehicle optionally on the same axle as the combustion engine. On a hybrid vehicle, the known methods of development prove to be incapable of simultaneously optimizing the consumption and the pollution control, with the driveability and the acoustics.

BRIEF SUMMARY

The aim of the present invention is to achieve an arbitration between the various acoustic, driveability, consumption, and pollution control constraints influencing a hybrid vehicle, in order to develop a target state for the driveline thereof.

For this purpose, it proposes that the selection of the target state thereof complies with a filtering sequence determining, from a list of available states, state consecutive eligible sets, as a function of combined driveability constraints.

BRIEF DESCRIPTION OF THE DRAWINGS

Other features and advantages of the invention will emerge clearly upon reading the following description of a nonlimiting embodiment thereof, with reference to the appended drawings, wherein.

DETAILED DESCRIPTION

The selection method described below relates to the target state of a vehicle driveline connecting at least a combustion engine and/or an electric machine to the wheels of the vehicle by means of a transmission. This state is selected from a set of states present on the transmission, defined by various combinations of couplers and reduction gears thereof in order to transfer the torque from the combustion engine and/or from the electric machine to the wheels over one or more gear ratios.

This method applies to all of the hybrid architectures, but also to purely combustion-powered or electrical vehicles having an automatic gearbox.

Figure 1:
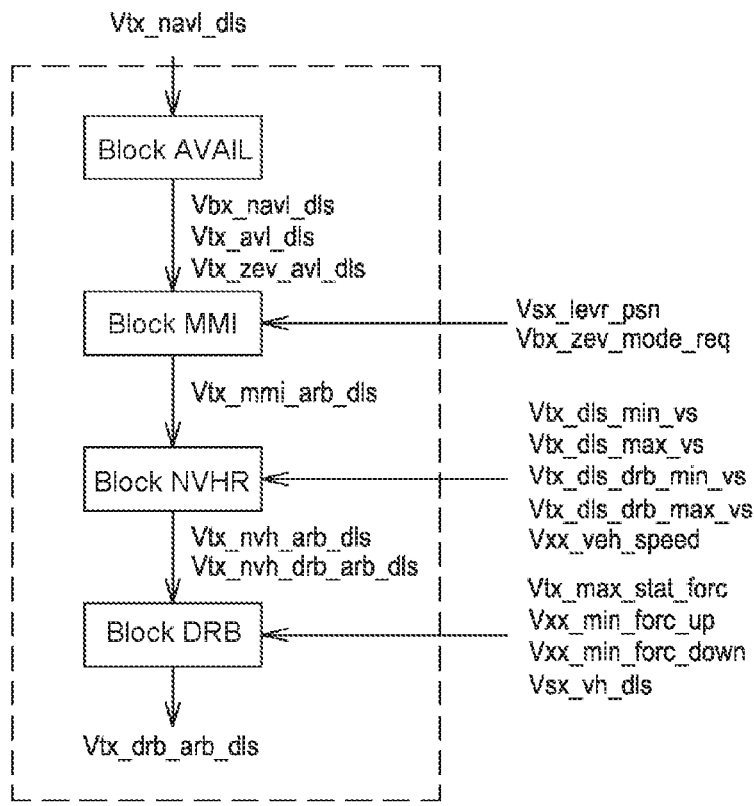
FIG. 1 is an overall representation of the filtering strategy linked to the driveability, FIG. 2 describes the initialization of a state eligibility vector, and the consideration of driveline dysfunctional states.

The selection of the target state complies with a filtering sequence determining, from a list of available states, state consecutive eligible sets, as a function of the combined driveability constraints. The proposed sequence is illustrated by FIG. 1, in which there is a first step (Block AVAIL) for initializing the eligibility vector and for considering the unavailable states, a second filtering step (Block MMI) linked to the man-machine interface of the driver and to the engaged energy mode, a second filtering step linked to the man-machine interface of the driver and to the engaged energy mode, a third filtering step linked to the speed limits set by the vibratory level and the mechanical constraints (Block NVHR), and a last filtering step linked to the force constraints (Block DRB).

The first block, or filtering step AVAIL, receives, in input, the list Vtx_navl_dls meaning "Unavailable Driveline State"

for the unavailable states, for a dysfunctional reason, or by construction. The three output vectors thereof are:

- Vbx_navl_dls, meaning "Unavailable Driveline State Presence", which signals the presence of dysfunction on some states of the concerned transmission architecture,
- Vtx_avl_dls, meaning "Available Driveline State", which gives the additional list for the states of drive chains which are available or not,
- Vtx_zev_avl_dls, meaning "ZEV Available Driveline State", which defines, from that previous, the states authorized in full-electric mode (or ZEV, meaning Zero Emission Vehicle mode).

These three vectors are transmitted to the following block (block MMI), which also receives two other vectors expressing the requirements of the driver:

- Vsx_levr_psn, meaning "Lever Position", which indicates the lever position (Neutral, Reverse, Drive) and,
- Vbx_zev_mode_req, meaning "Zev Mode Request", which indicates that the full-electric mode is required.

The output signal of the block MMI is the vector Vtx_mmi_arb_dls, meaning "Driveline states Man Machine Interface Arbitration", which defines the eligible states after the filtering linked to the man-machine interface, and to the required energy mode.

This last vector is transmitted to the filtering block linked to the speed limits and to the mechanical constraints (Block NVHR), which receives, moreover, the following information:

- Vtx_dls_min_vs, meaning "Driveline State Blocking Minimal Vehicle Speed", a vector introducing the minimum speeds for each state, considering the mechanical reliability of the members and the vibratory (NVH meaning Noise Vibration and Harshness) constraints,
- Vtx_dls_max_vs, meaning "Driveline State Blocking Maximal Vehicle Speed", indicating the maximum speeds for each of the states, considering the mechanical reliability of the members and the NVH constraints.
- Vtx_dls_drb_min_vs, meaning "Driveline State Blocking Minimal Vehicle Speed", indicating the minimum operating speeds for each state.
- Vtx_dls_drb_max_vs, meaning "Driveline State Blocking Maximal Vehicle Speed", giving the maximum operating speeds for each state, and
- Vxx_veh_speed, meaning "Vehicle Speed", which represents the speed of the vehicle.

At output, there are two new vectors:

- Vtx_nvh_arb_dls, meaning "Driveline States NVH Arbitration", which defines the eligible states after the filtering linked to the speed (Reliability and NVH) constraints, and
- Vtx_nvh_drb_arb_dls, meaning "Driveline States NVH Arbitration Tor Driveability", defining the eligible states after the filtering linked to the speed constraints (Reliability and ranges of speeds defined).

These two vectors are subjected to a filtering linked to the force constraints in the block DRB with, as new inputs:

- Vtx_max_stat_forc, meaning "Maximal Static Forces", defines all of the maximum forces that can be achieved for each of the driveline states.
- Vxx_min_forc_up meaning: "Minimal force for up", a force constraint to be met for the so-called "up" driveline states,
- Vxx_min_forc_down meaning "Minimal force for down", a force constraint to be met for the so-called "down" or downshifting states.
- Vsx_vh_dls, meaning "Vehicle Driveline State", an engaged state.

The final vector is Vtx_drb_arb_dls, which means "Driveline State Driveability arbitration". It groups together the driveline states eligible after the last filtering linked to the force constraints, at the end of the filtering complete strategy, linked to the driveability constraints.

Figure 2:
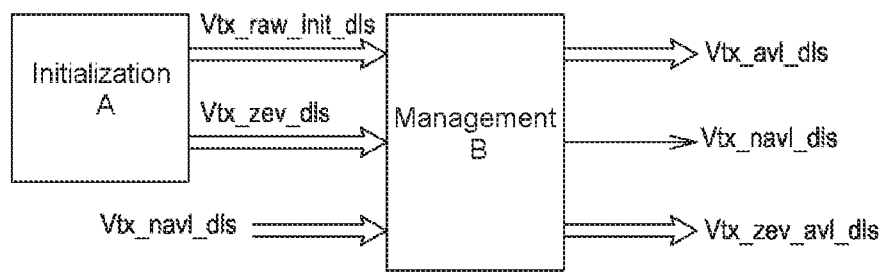

The block AVAIL, for initializing the eligibility vector and for considering the dysfunctional states, is described in FIG. 2. The first module A thereof is a step for initializing the states available in electric or ZEV (Zero Emission Vehicle) mode, and outside ZEV mode. This step defines, by calibration, two vectors linked to the architecture of the driveline. This "hard" initialization of the states available in ZEV mode and outside ZEV mode, produces intermediate vectors:

- Vtx_raw_init_dls, which represents the available states, and
- Vtx_zev_dls, which represents the states available in full-electric (ZEST) mode.

The vector of the driveline states available, Vtx_avl_dls, is defined as a function of the vector Vtx_raw_init_dls and of the vector Vtx_navl_dls in the second module B for management of the dysfunctional states. Three scenarios occur for a same state:

- this state is non-existent and/or non-functional: it is not eligible: the eligibility value of the vector Vtx_avl_dls linked to this state is equal to FALSE;
- this state exists, but is not functional, it is not eligible: the eligibility value of the vector Vtx_avl_dls linked to this state is equal to FALSE;
- this state exists and is available: it is eligible, and the eligibility value of the vector Vtx_avl_dls linked to this state is equal to TRUE.

If a state exists without being functional, the Boolean Vbx_navl_dls mentioned above is "TRUE", in order to adjust the force and speed constraints as a result.

The vector Vtx_zev_avl_dls is constructed from the eligibility vectors Vtx_avl_dls and Vtx_zev_dls. A state is considered eligible in full-electric mode if, and only if, it has been defined as such by calibration, it is present, and it is functional.

Figure 3:
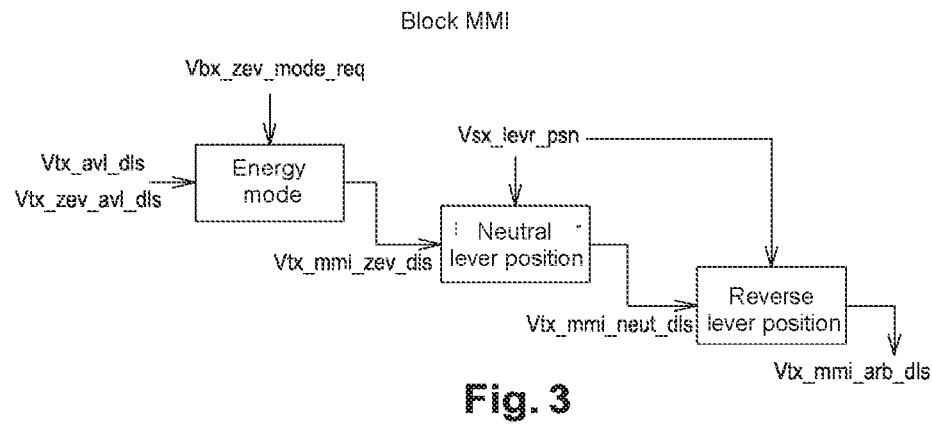
FIG. 3 shows the filtering mechanism linked to the man-machine interface and to the required energy mode, FIG. 4 describes the filtering linked to the speed constraints, and FIG. 5 describes the filtering linked to the force constraints.

The filtering block MMI, linked to the man-machine interface and to the required energy mode, is illustrated by FIG. 3. The role thereof to define the eligibility of the states as a function of the position of the gearshift lever and of the required energy mode. The first filtering step thereof is linked to the full-electric (ZEV) mode. It receives the vectors Vtx_avl_dls and Vtx_zev_avl_dls from the previous block, and the electric mode request Vbx_zev_mod_req. The resulting eligibility vector thereof is Vtx_mmi_zev_dls. If Vbx_zev_mode_req=TRUE, the eligibility vector used for the rest of the filtering will be Vtx_zev_avl_dls, which represents the driveline states which are eligible or not in full-electric mode. In the opposite case (Vbx_zev_mode_req=FALSE), the eligibility vector Vtx_avl_dls is used.

The second step of the block MMI is the filtering linked to the Neutral position of the lever (Vsx_levr_psn), the resulting eligibility vector of which is Vtx_mmi_neut_dls:

- if Vsx_levr_psn=Nsx_levr_neut (Neutral position), only the neutral state of the vector is TRUE, and the other driveline states are FALSE,
- if Vsx_levr_psn is different to Nsx_levr_neut, the eligible states remain those defined previously by the eligibility vector Vtx_mmi_zev_dls.

The last step of the block MMI is a filtering linked to the Reverse position of the lever Vsx_levr_psn, the resulting eligibility vector of which is Vtx_arb_dls. If Vsx_levr_psn=Nsx_levr_rvr (Reverse position), the set of the reverse (mechanical and electrical) and neutral states, grouped together in the vector Vtx_mmi_neut_dls, are retained. The other states have an eligibility status equal to FALSE in the resulting eligibility vector Vtx_mmi_arb_dls. In the case where Vsx_levr_psn=Nsx_levr_rvr, the vector Vtx_mmi_arb_dls is strictly equal to the vector Vtx_mmi_neut_dls. The eligibility vector Vtx_mmi_arb_dls, output from the block MMI, defines the set of the eligible or ineligible states, as a function of the position of the lever and of the required energy mode.

Figure 4:
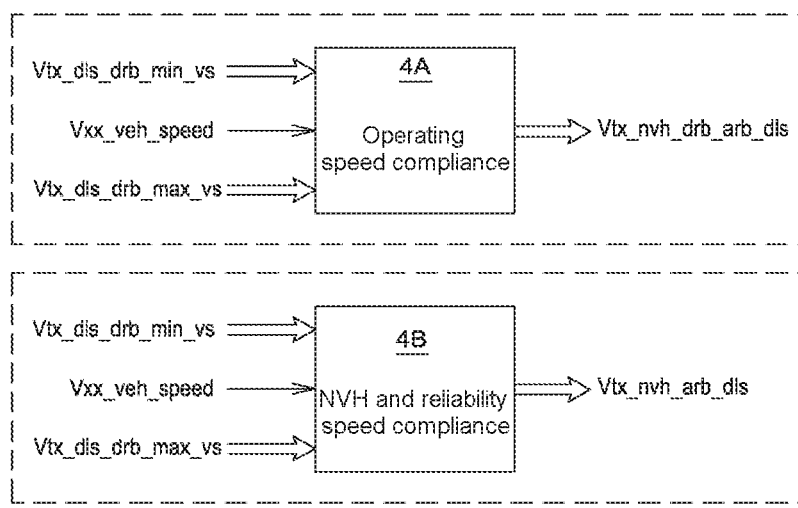
Figure 5:
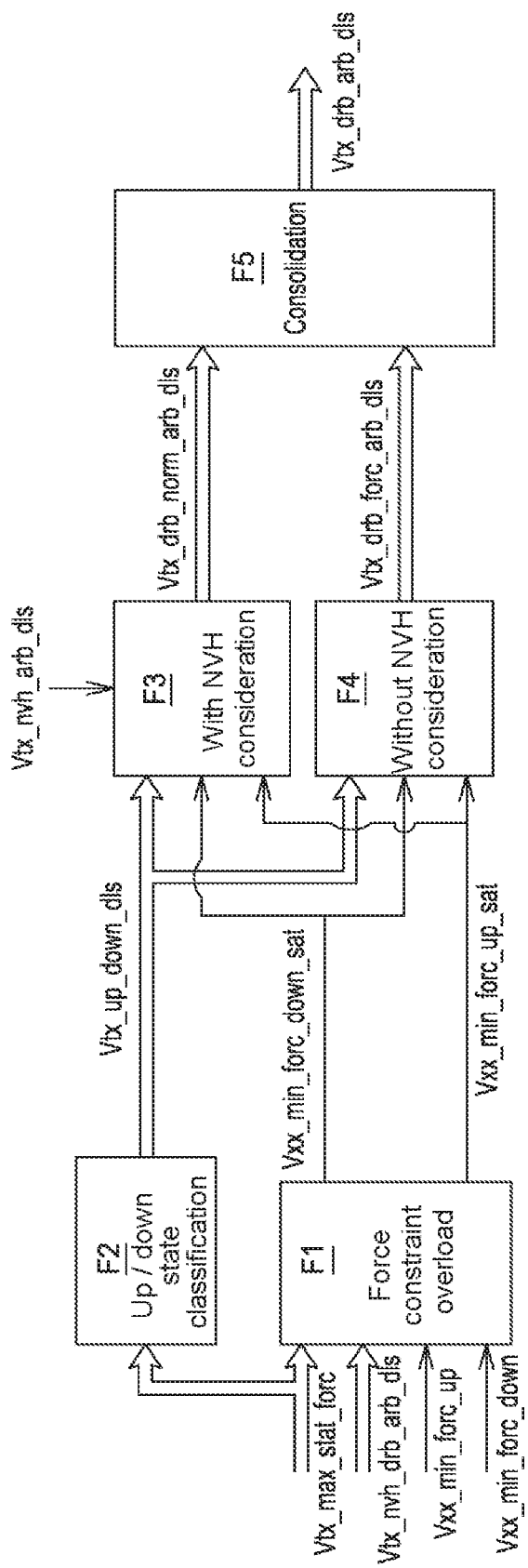

The aim of the block NVHR, for filtering linked to the speed (Reliability and NVH) constraints, which is illustrated by FIG. 4, is to define the states which comply with, or not, minimum and maximum speed constraints. In this block, two filtering operations take place at the same time, and produce the eligibility vectors Vtx_nvh_arb_dls and Vtx_nvh_drb_arb_dls.

The role of the block 4A is to define the states which are eligible or not at a given vehicle speed, by only considering the reliability aspect and the ranges of operating speeds defined. It checks if the operating ranges (minimum and maximum speeds of the members) would be complied with at the vehicle speed common for each of the eligible states, in order to prevent any risk of overspeed or underspeed. For each state, the common speed Vxx_veh_speed is compared with the minimum and maximum thresholds, specific to this state, which are defined in the vectors Vtx_dls_drb_min_vs and Vtx_dls_drb_max_vs, respectively.

If the common speed is between the minimum speed thereof and the maximum speed thereof, the state is eligible. The eligibility status previously determined in Vtx_mmi_arb_dls is retained. If the common speed is outside the reliability boundaries thereof, the state is ineligible. The eligibility status thereof moves to FALSE, in the resulting vector Vtx_nvh_drb_arb_dls.

The block 4B checks, at the same time, that the various eligible states also comply with the vibratory limits. It ensures that the common speed on each eligible state of (Vtx_mmi_arb_dls) complies with the minimum and maximum speeds that can be permitted on these states with respect to the vibratory level thereof (Noise Vibration and Harshness). These limits are defined through the vectors Vtx_dls_min_vs and Vtx_dls_max_vs. When the common speed is between these boundaries, only the eligibility statuses thereof previously defined in Vtx_mmi_arb_dls are retained in the resulting vector Vtx_nvh_arb_dls. In the opposite case, the state is ineligible, and the eligibility status thereof becomes equal to FALSE in the resulting eligibility vector Vtx_nvh_arb_dls.

The aim of the filtering block DRB linked to the force constraints is to define the states which can meet the various driveability constraints, in addition to the filtering operations previously carried out. The first step F1 of the block DRB overloads the force constraints to a maximum achievable force level, in order to not make ineligible, in certain situations, states that are eligible in the previous steps. This mechanism compares the maximum forces available on each eligible state in the operating range thereof, in order to overload the force constraints on the highest one thereof. It occurs, for example, on a steep road, which requires a high acceleration (force) capacity, which is greater than the potential of the eligible states in the previous steps. In the absence of overload, the set of the states can then become ineligible, with the exception of the neutral state.

The maximum force available on the set of the states is calculated from the vectors Vtx_max_stat_forc and Vtx_nvh_drb_arb_dls. If a state is eligible in the vector Vtx_nvh_drb_arb_dls, i.e. on the operating range thereof, the maximum force available on this state (and defined in the vector Vtx_max_stat_forc) is compared with the other maximum forces of the states which are also available, in the operating ranges thereof. The force constraints Vxx_min_forc_up and Vxx_min_forc_down are then overloaded to the highest force. The overloaded force constraints are called Vxx_min_forc_up_sat and Vxx_min_forc_down_sat, respectively.

The second step F2 of the block DRB relates to recognizing the downshifting or the upshifting, with respect to the common state. The information contained in the resulting vector Vtx_up_down_dls makes it possible to define the force constraints to be complied with for each of the states. This vector defines three separate classifications for each state of the driveline: "down", "common", or "up".

The third step F3 of the block DRB is a filtering mechanism with consideration of the NVH vibratory level. The aim of this mechanism is to define the states that are eligible or not with respect to the force constraints. Complying with the force constraints is only checked on so-called "traction" states, namely the set of the states with the exception of the various reverse states and the neutral state. Three cases arise:
  the state is "up": the maximum force thereof defined in the vector Vtx_max_stat_forc is compared with the force constraint Vxx_min_forc_up_sat;
  the state is "down": the maximum force thereof defined in the vector Vtx_max_stat_forc is compared with the force constraint Vxx_min_forc_down_sat;
  the state is common: the maximum force thereof defined in the vector Vtx_max_stat_forc is compared with the minimum force between Vxx_min_forc_down_sat and Vxx_min_forc_up_sat.

In each of the cases, if the maximum force of the state is greater than the force constraint thereof, it is eligible. The eligibility status thereof defined in the eligibility vector Vtx_nvh_arb_dls is retained in the resulting eligibility vector Vtx_drb_norm_arb_dls. Otherwise, the eligibility status thereof becomes equal to FALSE in the vector Vtx_drb_norm_arb_dls. For the reverse states and the neutral, the eligibility statuses defined in Vtx_nvh_arb_dls are retained unconditionally in the eligibility vector Vtx_drb_norm_arb_dls. Thus, the obtained vector Vtx_drb_norm_arb_dls represents the driveline states that are eligible or not, considering all of the constraints of the filtering overall strategy: the available and functional states, the MMI constraints, the energy mode constraints, the reliability and NVH speed constraints, and the force constraints.

The fourth step F4 of the block DRS is a filtering mechanism without considering the NVH vibratory level. The functioning thereof is strictly identical to the previous one. The only difference is the fact that the eligibility vector Vtx_nvh_drb_arb_dls is used instead of the eligibility vector Vtx_nvh_arb_dls, and that the resulting eligibility vector is Vtx_drb_forc_arb_dls. This vector represents the driveline states complying with all of the driveability constraints, with the exception of the NVH constraints.

The fifth block F5 is a final mechanism for consolidation between the eligibility vectors Vtx_drb_norm_arb_dls and Vtx_drb_forc_arb_dls. The aim of this consolidation is to meet the force constraints first and foremost with respect to the NVH constraints in the case where none of the states can comply both with the force constraints and the NVH constraints. If the set of the states, with the exception of the neutral, are ineligible according to the eligibility vector Vtx_drb_norm_arb_dls, the eligibility final vector is equal to Vtx_drb_forc_arb_dls. The method thus meets the requests for forces in all of the scenarios where the NVH constraints would not allow a "traction" state to be authorized. Otherwise, the eligibility final vector Vtx_drb_arb_dls is equal to Vtx_drb_norm_arb_dls, which is the nominal operation with consideration of all of the driveability constraints. The eligibility final vector Vtx_drb_arb_dls represents the set of the states that are eligible or not, from a driveability perspective.

The method of the invention has many advantages, the main ones being the ease of implementation thereof, and the speed of development thereof. This method can be used for all of the architectures provided with an automatic gearbox, which architectures are hybrid, combustion-powered or electric. This method can be linked with an energy management law particularly for a hybrid vehicle. It allows for the optimization of the consumption and the pollution control, as well as the driveability and the acoustics of a vehicle.

The invention claimed is:

1. A method for selecting a target state of a vehicle driveline connecting at least a combustion engine and/or an electric machine to the wheels of the vehicle by a transmission, from a set of states present on the transmission, which are defined by various combinations of couplers and reduction gears thereof in order to transfer torque from the combustion engine and/or from the electric machine to the wheels over one or more gear ratios, comprising:

filtering to determine, from a list of available states, state consecutive eligible sets as a function of combined driveability constraints, the filtering comprising:

a first filtering step of considering all of the available states from the set of states present on the transmission and outputting vectors including a first vector representative of the available states and a second vector representative of the authorized states in a full electric mode, after the first filtering step, a second filtering step linked to a man-machine interface of a driver and to an engaged energy mode, the second filtering step including:

selecting a selected vector from the first vector or the second vector based on the engaged energy mode,
performing further filtering the selected vector based on an output of the man-machine interface; and
outputting a third vector based on the further filtering, after the second filtering step, a third filtering step of filtering the third vector based on speed constraints, and after the third filtering step, a fourth filtering step of filtering a fourth vector output from the third filtering step based on force constraints of the driveline.

2. The selection method as claimed in claim 1, wherein the filtering produces an eligibility final vector at an end of all of the filtering, which represents the set of the states eligible as a function of the driveability constraints.

3. The selection method as claimed in claim 1, the first filtering step delivers a dysfunction vector signaling a presence of dysfunction on some states.

4. The selection method as claimed in claim 1, wherein the third filtering step compares a common speed with minimum and maximum thresholds, specific to each eligible state of the third vector.

5. The selection method as claimed in claim 4, wherein the third filtering step checks, at the same time, that the common speed on each eligible state of the third vector complies with the minimum and maximum speeds that can be permitted on these states with respect to a vibratory level thereof.

6. The selection method as claimed in claim 1, the fourth filtering step includes a mechanism for overloading force constraints on a highest force which compares maximum forces available on each eligible state with regard to an operating range thereof in order to overload the force constraints on the highest one thereof.

7. The selection method as claimed in claim 1, wherein the fourth filtering step includes a mechanism for recognizing up or down states and a common state.

8. The selection method as claimed in claim 1, wherein the fourth filtering step includes a mechanism for filtering with consideration of a vibratory level on the set of the states of the eligible states, except on various reverse states and a neutral state.

9. The selection method as claimed in claim 1, wherein the fourth filtering step includes a mechanism for filtering without consideration of a vibratory level delivering a vector which represents the states of the driveline complying with all of the driveability constraints with the exception of vibratory level constraints.

10. The selection method as claimed in claim 8, wherein the filtering includes a final mechanism for consolidation between eligibility vectors of the fourth filtering step, with and without consideration of the vibratory level.

* * * * *